April 7, 1931.    W. J. KURTZ ET AL    1,799,562
POTATO PEELER
Filed Dec. 4, 1929
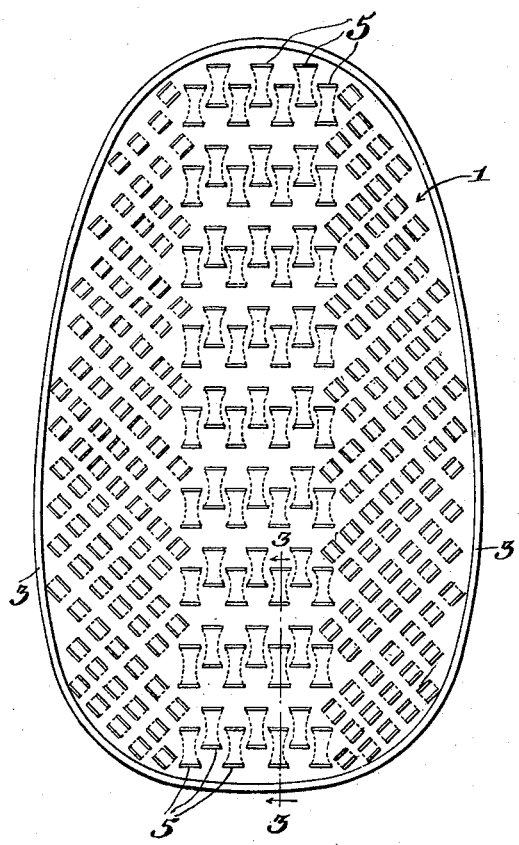
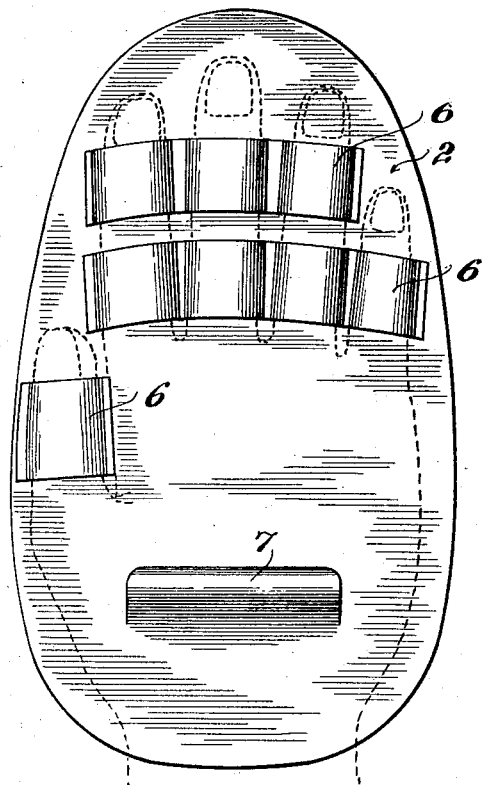
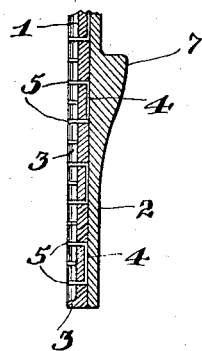
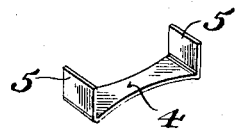
Inventors
William J. Kurtz
AND Frederick H. Shelledy
By Donald L. Maxson.
Attorney Patented Apr. 7, 1931

1,799,562

UNITED STATES PATENT OFFICE

WILLIAM J. KURTZ AND FREDERICK H. SHELLEDY, OF WASHINGTON, DISTRICT OF COLUMBIA

POTATO PEELER

Application filed December 4, 1929. Serial No. 411,528.

This invention relates to improvements in culinary implements, and more particularly to an improved form of potato peeler, which may be supported on one hand in the manner of a glove, and which will be provided with a plurality of upwardly extending cutting teeth for removing the peel or outer skin from a potato or other vegetable when they are rubbed back and forth over the vegetable.

An object of the invention is to provide an improved potato peeler, which will have a flexible body portion in which a plurality of cutting teeth are molded or vulcanized, and which will have finger stalls formed on the back thereof for positively supporting the same on a hand of the user.

Another object of the invention is to provide an improved potato peeling implement having its body portion preferably formed of laminated sheets of rubber, between which a plurality of metal staples are disposed with their prongs extending through one of the sheets of rubber and above the same to form cutting teeth, said staples being securely held in position by a subsequent vulcanizing of the rubber sheets.

A further object of the invention is to provide an improved potato peeler which will have a flexible body portion in which a plurality of cutting teeth are molded or vulcanized, and which will have an annular raised bead of rubber formed on the side of the body carrying the teeth, and a plurality of finger stalls on the opposite side thereof.

Other objects will appear as the description proceeds.

In the accompanying drawings which form a part of our application,

Fig. 1 is a plan view of the front of our improved potato peeler;

Fig. 2 is a plan view of the back of our improved potato peeler;

Fig. 3 is a sectional view taken on the line 3—3 of Fig. 1, and

Fig. 4 is a perspective view of one of the staples forming the cutting teeth.

Like characters of reference are used throughout the following specification and the accompanying drawings to designate corresponding parts.

In carrying out our invention, we provide two sheets of flexible material 1 and 2, preferably of rubber, and form an annular bead 3 about the edge of the sheet 1 to extend upwardly from the surface thereof.

A plurality of metal staples 4 are then arranged as shown in Fig. 1 of the drawings, by forcing the spaced cutting edges 5 through the sheet 1, so that they will extend above the surface of the same to the approximate height of the annular bead 3. The sheet of rubber 2 is then placed in contact with the sheet 1, and the same vulcanized together, thereby positively holding the staples and cutting teeth in fixed position with respect to each other.

We have provided finger stalls 6 on the back of the sheet 2, there being one stall for the thumb and two spaced stalls for each finger of the hand, also a molded palm rest 7.

We have found by experiment that the particular arrangement of the staples shown in Fig. 1 is the most desirable, that is, the cutting edges are arranged in spaced rows, and the adjacent rows are staggered, so that there will be an overlapping of the cutting teeth. The teeth are arranged to extend transversely across the body of the implement throughout the central portion thereof, while the teeth at the opposite sides thereof are arranged angularly thereto.

The mode of operation is as follows: The implement is supported on one hand by placing the thumb and fingers in the stalls 6, with the teeth extending outwardly from the palm of the hand. The potato or other vegetable to be peeled, is then grasped by the other hand, and is rubbed back and forth over the cutting teeth, or the hand supporting the implement is closed sufficiently to form a pocket in which the vegetable may be placed, whereupon movement of the implement over the surface of the vegetable will scrape the peel therefrom. If desired, the vegetable may be grasped in one hand and the implement rubbed over the surface thereof to effect the peeling of the same. It is to be understood that the relative movement between the teeth of the implement and the vegetable to be peeled is what causes the scraping of the peel from the said vegetable.

The body of the implement being flexible permits the same to readily flex upon movement of the hand supporting the same, thereby adapting the same to accommodate any size of vegetable and any curvature of surface.

Many minor changes in detail of construction may be resorted to without departure from the spirit of the invention.

Having thus described our invention what we claim as new and desire to secure by Letters Patent of the United States is:

1. A device of the character described comprising a flexible body, a plurality of angularly arranged offset cutting teeth embedded in said body, a protecting bead formed about the periphery of said body and extending approximately flush with the cutting edges of said teeth, and hand engaging means on the back of said body.

2. A device of the character described comprising a laminated body formed of sheet rubber, a plurality of angularly arranged offset staples having spaced cutting teeth embedded between the sheets of rubber and extending through and above one of said sheets, and a protecting bead integrally formed about the periphery of said body and extending approximately flush with the cutting edges of said teeth.

3. A device of the character described comprising a molded flexible body, a plurality of angularly arranged offset staples having spaced cutting edges embedded in said body, a protecting bead formed integrally about the periphery of said body and extending approximately flush with the cutting edges of said teeth, and finger stalls formed on the back of said body.

In testimony whereof we affix our signatures.

WM. J. KURTZ.
F. H. SHELLEDY.